(12) United States Patent
Sato et al.

(10) Patent No.: US 6,887,617 B2
(45) Date of Patent: May 3, 2005

(54) MULTI-LAYER ELECTRODE STRUCTURE, AND METHOD OF MANUFACTURING SAME

(75) Inventors: Takaya Sato, Chiba (JP); Tatsuo Shimizu, Tokyo (JP)

(73) Assignees: Nisshinbo Industries, Inc., Tokyo (JP); Itochu Corp., Osaka (JP)

( * ) Notice: Subject to any disclaimer, the term of this patent is extended or adjusted under 35 U.S.C. 154(b) by 86 days.

(21) Appl. No.: 09/784,321

(22) Filed: Feb. 16, 2001

(65) Prior Publication Data

US 2001/0044045 A1 Nov. 22, 2001

(30) Foreign Application Priority Data

Feb. 16, 2000 (JP) ........................................ 2000-038744

(51) Int. Cl.[7] ........................... H01M 4/62; H01G 9/04; H01G 9/042; H01G 9/048
(52) U.S. Cl. ........................ 429/128; 429/217; 361/502; 361/503
(58) Field of Search .............................. 429/128, 209, 429/212, 217; 361/502, 503, 508, 516, 528, 532

(56) References Cited

U.S. PATENT DOCUMENTS 4,804,592 A * 2/1989 Vanderborgh et al. ........ 429/33
5,246,627 A * 9/1993 Heeger et al. .............. 252/500
5,744,258 A 4/1998 Bai et al.

FOREIGN PATENT DOCUMENTS

| DE | 4108805 A1 | 9/1991 |
| JP | 11-67214 A * | 3/1999 |
| WO | WO-9620504 A | 7/1996 |
| WO | WO-9744840 A | 11/1997 |

OTHER PUBLICATIONS

JPO machine translation of JP 11–67214 A (Mar. 1999).*

* cited by examiner

Primary Examiner—Susy Tsang-Foster
(74) Attorney, Agent, or Firm—Apex Juris, PLLC; Tracy M Heims

(57) ABSTRACT

A multi-layer electrode structure is provided comprised of a plurality of electrode layers composed of a binder and an electrode material and coated on a current-collecting member, each of the electrode layers including a macromolecular substance wherein a first electrode layer in contact with the current-collecting member and the second electrode layer in contact with the first electrode layer are formed of different constituents or have different proportions of the same constituent. A method of forming the multi-layer electrode structures as well as a battery and double-layer capacitor formed from the multi-layer electrode structures are also disclosed.

6 Claims, 12 Drawing Sheets

(A)

(B)

(A)

(B)

(A)

(B)

(A)

(B)

(C)

(A)

(B)

(C)

(D)

MULTI-LAYER ELECTRODE STRUCTURE, AND METHOD OF MANUFACTURING SAME

BACKGROUND OF THE INVENTION

1. Field of the Invention

The present invention relates to a multi-layer electrode structure, a method for manufacturing same and a battery and an electrical double-layer capacitor utilizing the multi-layer electrode structure.

2. Description of Related Art

A typical electrode structure of the prior art is manufactured by coating a current-collecting member surface with a compound mixture containing an electrode material, a powdered electrically-conducting substance, a binder and solvent, and vaporizing off the solvent to form a layered electrode structure.

SUMMARY AND OBJECT OF THE INVENTION

This invention has the object of manufacturing an electrode structure comprised of multiple electrode layers.

This invention has the further object of providing a multi-layer electrode structure having effective adhesive properties.

This invention has the yet further object of providing a multi-layer electrode structure with low electrical resistance.

This invention has the still further object of providing a battery and double-layer capacitor comprised of a multilayer electrode structure with low electrical resistance and effective adhesive properties.

This invention is directed to a multi-layer electrode structure comprised of a plurality of electrode layers at least composed of a binder made of a macromolecular substance and an electrode material coated on a current-collecting member and wherein the first electrode layer formed in contact with the current-collecting member and a second electrode layer formed on the first electrode layer are formed of different constituents and/or have different proportions of the same constituent.

This invention is further directed to a multi-layer electrode structure comprised of a plurality of electrode layers at least composed of a binder made of a macromolecular substance and an electrode material, coated on a current-collecting member and wherein the binder of the first electrode layer formed in contact with the current-collecting member has a stronger adhesive strength than the second electrode layer formed on the first electrode layer.

This invention still further is directed to a multi-layer electrode structure comprised of a plurality of electrode layers at least composed of a binder made of a macromolecular, an electrode material and a powdered electrically-conducting substance coated on a current-collecting member, wherein each layer at least includes a macromolecular substance and wherein the first electrode layer formed in contact with a current-collecting member, has a higher electrical conduction rate than the second electrode layer formed on the first electrode layer.

This invention still further is directed to a multi-layer electrode structure as above, wherein at least one layer of electrode material is adhered by an ion-conducting polymer.

This invention still further is directed to a multi-layer electrode structure as above, wherein the macromolecular binder for one electrode layer other than the first electrode layer uses a binder polymer easily prone to form fibrils.

This invention still further is directed to a battery containing at least one electrode at least comprised of a multi-layer electrode structure coated on a current-collecting layer, each layer composed of a binder made of a macromolecular substance, an electrode material, and a powdered electrically-conducting substance wherein the battery further includes a liquid or non-liquid electrolyte between the electrodes, wherein the first electrode layer formed in contact with a current-collecting member has a binder of stronger adhesive strength and a higher electrical conduction rate than the second electrode layer formed on the first electrode layer.

This invention still further is directed to a battery as above, wherein a binder of the same liquid or non-liquid electrolyte or of a high affinity is utilized in the electrode layer in contact with the liquid or non-liquid electrolyte.

This invention still further is directed to a double-layer capacitor with at least one electrode comprised of a mufti-layer electrode structure coated on a current-collecting member, each layer at least composed of a binder, an electrode material, and a powdered electrically-conducting substance, wherein the double-layer capacitor further includes liquid or non-liquid electrolyte between the electrodes, wherein the first-electrode layer formed in contact with the current-collecting member has a binder of stronger adhesive strength and a higher electrical conduction rate than the second electrode layer formed on the first electrode layer.

This invention still further is directed to a double-layer capacitor as above, wherein a binder of the same liquid or non-liquid electrolyte or of a high affinity is utilized in the electrode layer in contact with the electrolyte.

This invention is further directed to a method for manufacturing a multi-layer electrode structure as above described, the method comprising the steps of forming a first electrode layer by coating a mixed material containing a macromolecular binder, an electrode substance, and a solvent onto a current-collecting member and drying the mixed material, forming a second electrode layer by coating a mixed material containing a macromolecular binder, an electrode substance, and a solvent on top of the first electrode layer and drying the mixed material to form an electrode of multiple layers, and wherein the macromolecular binders used are such that the binding strength of the first electrode layer is stronger than the second electrode layer.

This invention is further directed to a method of manufacturing a multi-layer electrode structure as previously described, the method comprising the steps of forming a first electrode layer by coating a mixed material containing a macromolecular binder, an electrode substance, a solvent, and a powdered electrically-conducting substance onto a current-collecting member and drying the mixed material, forming a second electrode layer by coating a mixed material containing a macromolecular binder, an electrode substance, a solvent, and a powdered electrically-conducting substance on top of the first electrode layer and drying the mixed material to form an electrode of multiple layers, and using powdered electrically-conducting substances such that the electrical conduction rate of the first electrode layer is higher than the second electrode layer.

This invention still further is directed to a manufacturing method for a multi-layer electrode structure as above, wherein a mixed material containing macromolecular binder, electrode substance, end solvent are mixed and coated onto the second electrode layer and drying the mixed material to form an electrode layer such that the third electrode layer has a stronger bonding force than the second electrode layer.

This invention still further is directed to a multi-layer electrode structure as above, wherein
the electrode material for at least one electrode layer is coated with an ion-conducting polymer.

This invention is further directed to a multi-layer electrode structure as above, wherein the macromolecular binder for at least one electrode layer other than the first electrode layer uses a binder polymer easily prone to form fibrils.

This invention still further is directed to a multilayer electrode structure as above, wherein the powdered electrically-conducting substance of the first electrode layer contains support electrolytic salts.

This invention still further is directed to a method of manufacturing a battery with at least one electrode comprised of a multi-layer electrode structure as above described, the method comprising forming a first electrode layer by coating a mixed material containing a macromolecular binder, an electrode substance, a solvent, and a powdered electrically-conducting substance onto a current-collecting member and drying the mixed material, forming a second electrode layer by coating a mixed material containing a macromolecular binder, an electrode substance, a solvent, and a powdered electrically-conducting substance on top of the first electrode layer and drying the mixed material to form an electrode of multiple layers, and using macromolecular binders such that the bonding force of the first electrode layer is stronger than the bonding force of the second electrode layer and using powdered electrically-conducting substances so that the electrical conduction rate of the first electrode layer is higher than the second electrode layer.

This invention is further yet directed to a method of manufacturing a double-layer capacitor with an electrode comprised of a multi-layer electrode structure as above described, the method comprising forming a first electrode layer by coating a mixed material containing a macromolecular binder, an electrode substance, a solvent, and a powdered electrically-conducting substance onto a current-collecting member and drying the mixed material, forming a second electrode layer by coating a mixed material containing a macromolecular binder, an electrode substance, a solvent, and a powdered electrically-conducting substance on top of the first electrode layer and drying the mixed material to form an electrode of multiple layers, and using macromolecular binders such that the bonding force of the first electrode layer is stronger than the binding force of the second electrode layer and using powdered electrically-conducting substances such that the electrical conduction rate of the first electrode layer is higher than that of the second electrode layer.

The above and other objects and the attendant advantages of the present invention will become readily apparent by reference to the following detailed description when considered in conjunction with the accompanying drawings.

DETAILED DESCRIPTION OF THE PREFERRED EMBODIMENTS

The embodiments of the invention are next described while referring to the accompanying drawings.

Multi-Layer Electrode Structure

The multi-layer electrode structure of this invention can be used as at least one electrode of electronic components having electrolyte between the electrodes. When the electrical component is a battery, the multilayer electrode structure is capable of exchanging electricity by way of the electrolyte ions. When the electrical component is a double-layer capacitor, the multi-layer electrode structure forms an electrical double-layer capacitor between the electrolyte and material with a large surface area.

Figure 1:
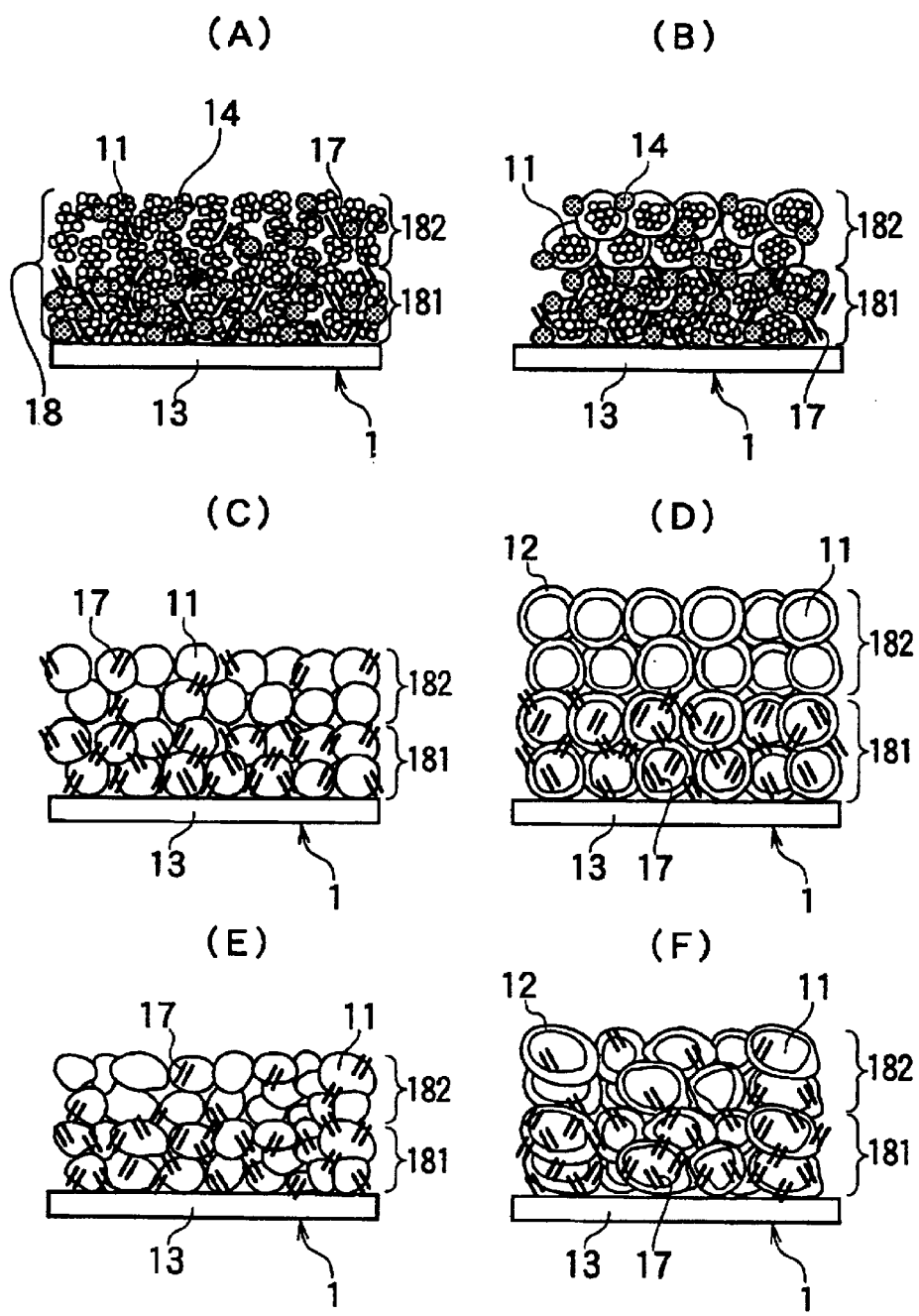
FIGS. 1(A)–1(F) are views of different types of multi-layer electrode structures.

FIG. 1 shows examples of typical multi-layer electrode structures. The electrode structure of FIG. 1(A) is used as the positive electrode of a battery. In this figure, the electrode structure 1 is comprised of an electrode layer 18 consisting of powdered electrode active substance as an electrode material 11, a powdered electrically-conducting substance 14 and binder 17 (namely, a bonding agent and fixer) attached to the surface of the current-collecting member 13. The electrode layer 18 is multi-layered in the drawings consisting of a first electrode layer 181 and a second electrode layer 182. The first electrode layer 181 has a larger concentration of powdered electrically-conducting substance 14 and binder 17 than the second electrode layer 182. Here, $LiCoO_2$ for example, is used as the powdered electrode active substance. In FIG. 1(B), an ion-conducting polymer 12 is coated on the electrode material 11 of FIG. 1(A). This ion-conducting polymer 12 also functions as a binder, however, a binder 17 is mixed in the first electrode layer 181, to enhance the bonding. The first electrode layer 181 has a concentration of powdered electrically-conducting substance 14 larger than the second electrode layer 182. FIG. 1(C) shows an electrode structure used as the negative electrode of a battery. In this figure, the multi-layered electrode structure 1 is an electrode layer 18 consisting of a powdered electrode active substance as an electrode material 11 and a binder 17 attached to the surface of the current-collecting member 13. Here, graphite powder is for example, used as the powdered electrode active substance. The electrode layer 181 has a larger concentration of binder 17 than the second electrode layer 182. In FIG. 1(D), the electrode material of FIG. 1(C) is coated with an ion-conducting polymer 12. This ion-conducting polymer 12 also functions as a binder, however, a binder 17 is mixed with the first electrode layer 181 to enhance the bonding. FIG. 1(E) shows the electrode structure used as the electrode for a double-layer capacitor. In this figure, the electrode structure 1 is an electrode layer 18 consisting of a large surface area material as an electrode material 11 and a binder 17 attached to the surface of the current-collecting member 13. Here, electrically-conducting carbon is used for example as the large surface area material. The electrode layer 181 has a larger concentration of binder 17 than the second electrode layer 182. In FIG. 1(F), the powdered electrically-conducting carbon of FIG. 1(E) is covered by the ion-conducting polymer 12. This ion-conducting polymer 12 also functions as a binder, however, a binder 17 is mixed with the first electrode layer 181 to enhance the bonding. The electrode material covered with the ion-conducting polymer is described in detail later on.

Multi-Layer Electrode

The multi-layer electrode is a lamination of a plurality of layers having different characteristics. Various methods-can be used for obtaining the different characteristics and besides the drawings of FIG. 1(A) through (F) can involve changing th types and mixture of allotted substances.

Figure 2:
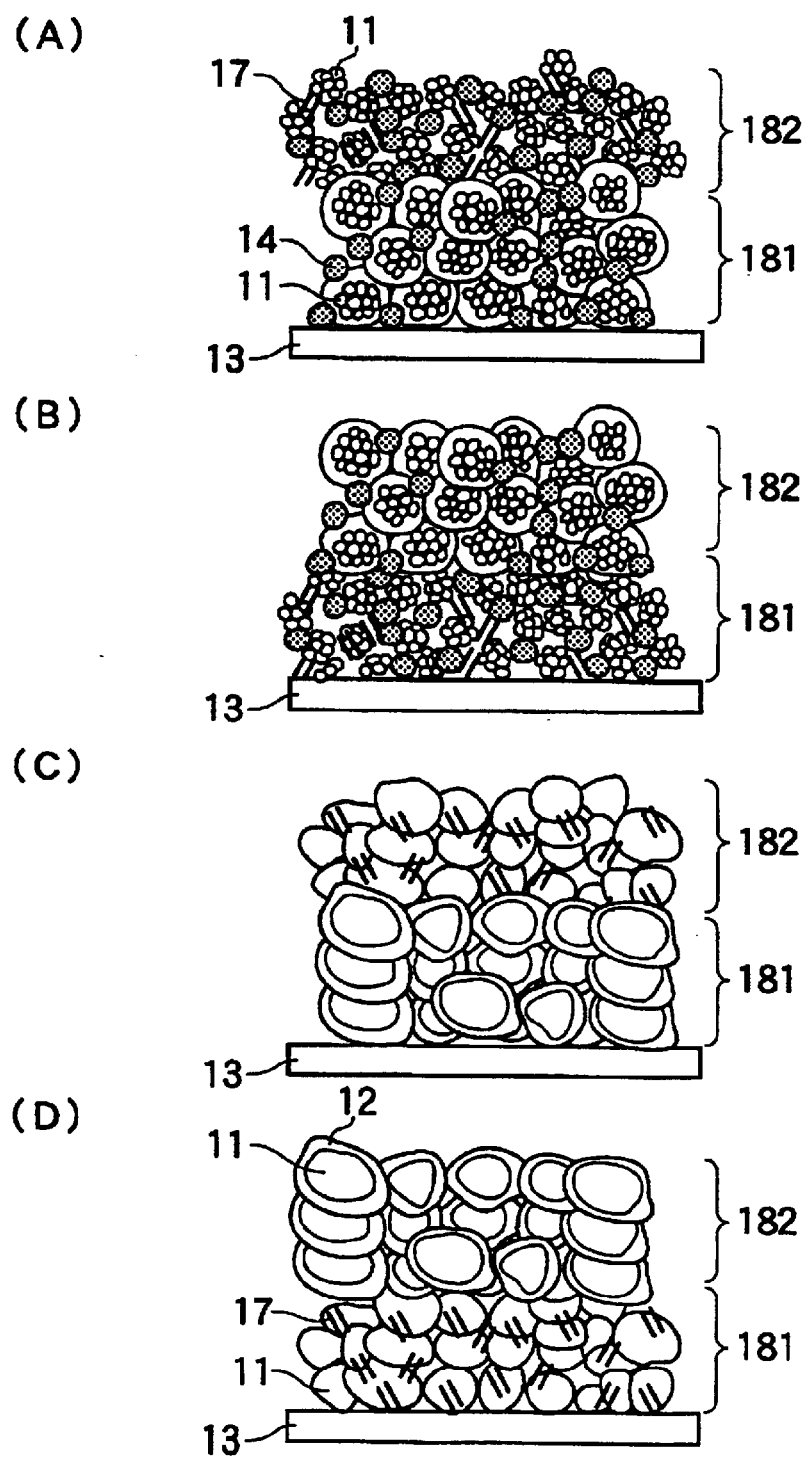
FIGS. 2(A)–2(D) are views of other multi-layer electrode structures.

FIGS. 2(A) and 2(B) are examples of using a powdered electrode active substance as the electrode material, and having powdered electrode active substances coated and not coated with ion-conducting polymer 12 as the first electrode layer and the second electrode layer, respectively. FIGS. 2(C) and 2(D) are examples of using a powdered electrode active substance as the electrode material, and having active electrically-conducting carbon coated and not coated with ion-conducting polymer 12 as the first electrode layer and the second electrode layer, respectively.

Using a binder polymer that easily tends to form fibrils as the binder in the second electrode layer allows bonding the electrode material and powdered electrically-conducting substance with only a small amount of binder. However, binder polymer that easily forms fibrils has poor bonding strength to the current-collecting member so such binder polymer is used in layers other than the first electrode layer.

Further, the lithium ion density becomes larger and the propagation speed of the lithium ions becomes faster when the electrode layer contains support electrolytic salts. In particular, when support electrolytic salts are inserted into the first electrode layer, the lithium ion movement in the first electrode layer is easily propagated to the second electrode layer.

A high affinity binder polymer or a polymer having the same electrolyte as in the electrolyte in contact with the electrode layer may be utilized when using the multi-layer electrode structure in a battery or double-layer capacitor. For example, the same polymer as the electrolyte can be used in the third electrode layer or a high affinity binder polymer may be used in the third electrode layer placed on the second electrode layer.

Further, the characteristics of the multi-layer electrode can be changed by various methods including using a binder polymer that bonds securely to the current-collecting member, changing the type of powdered electrically-conducting substance in each layer, changing the average particle size of the powdered electrode active substance, using a binder polymer that conducts ions, and utilizing an ion-conducting polymer which is the same as used for as the electrolyte.

Manufacturing Method for the Multi-Layer Electrode Structure

Figure 3:
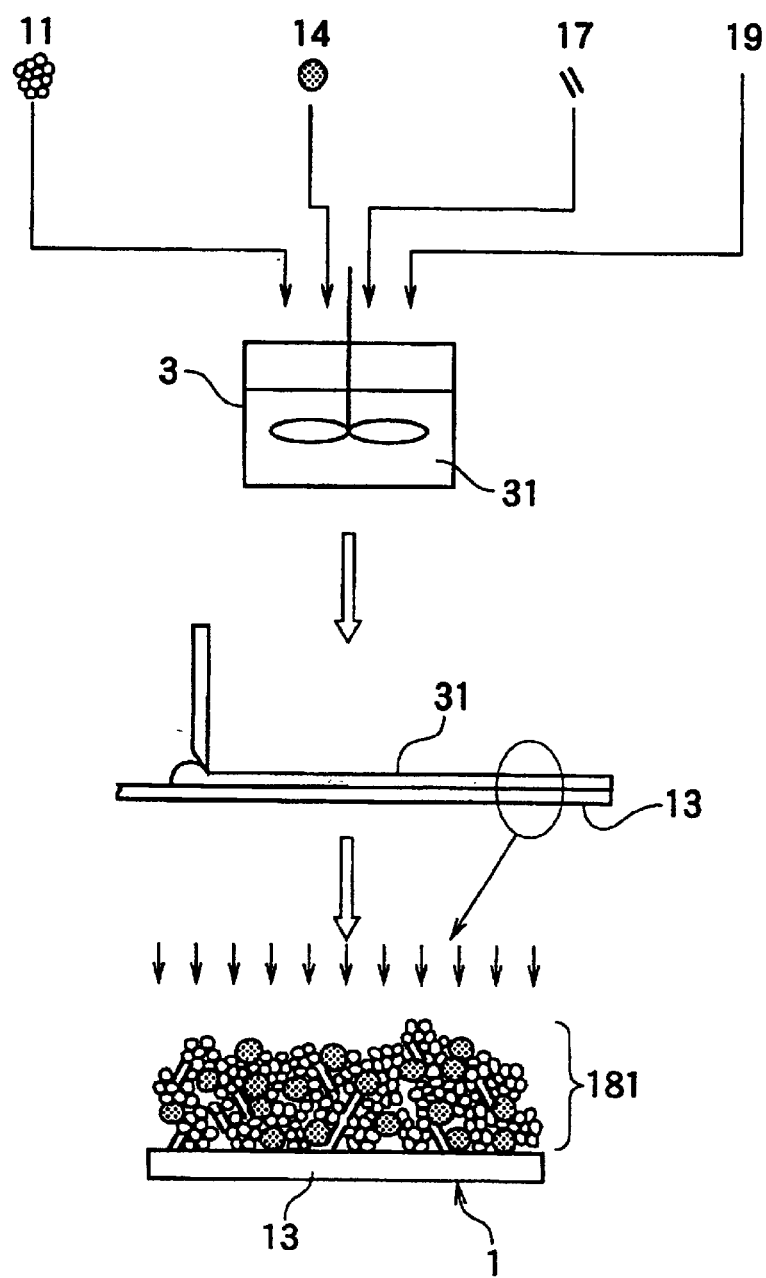
FIG. 3 is a schematic view of the fabrication of the electrode structure.

An example of the manufacturing method used to produce the multi-layer electrode structure is shown in FIG. 3. To manufacture the multi-layer electrode structure 1, an electrode material 11, a powdered electrically-conducting substance 14, a binder 17, and a solvent 19 are mixed together in a mixer 3 to obtain a slurry constituting the mixed material 31. This mixed material 31 is thinly coated onto the current-collecting member 13. The method for coating the mixed material is by surgical knife applicator, etc. This coating of mixed material is vaporized, dried, and attached to the current-collecting member 13 as the first electrode layer 181. Here, the vaporizing and drying of the solvent and coating the mixed material 31 onto the current-collecting member is performed by applying heated air from a heated air oven or by directing infrared radiation from an infrared lamp device. Next, a second electrode layer 182 is formed on the first electrode layer 181 in the same manner. Formation of the second layer may be performed before the drying of the first electrode layer.

Figure 4:
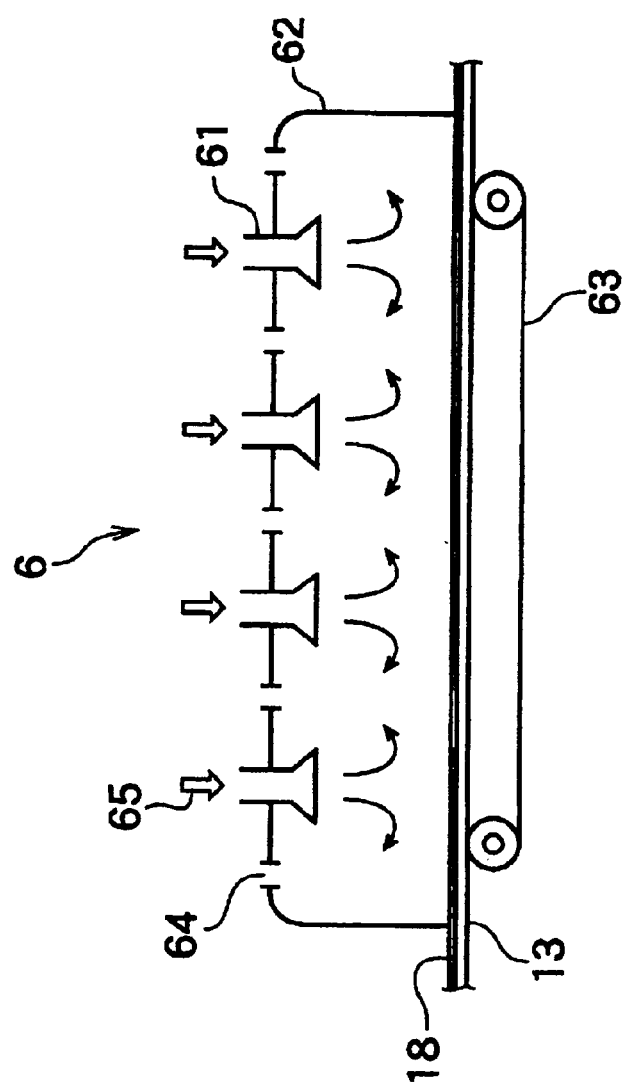
FIG. 4 is a schematic view of a prior art coating method using a heated air oven.

As shown, for example, in FIG. 4, with respect to a hot air heating device 6, the electrode structure comprising the electrode layer 18 coated onto the current-collecting member 13 is moved by conveyor 63 in cabinet 62. Hot air 65 is blown from a hot air blow outlet 61 toward the electrode layer 18; and the solvent contained in the electrode layer 18 is vaporized. The hot air moves the solvent outside via an outlet 64 of the cabinet 62.

Figure 5:
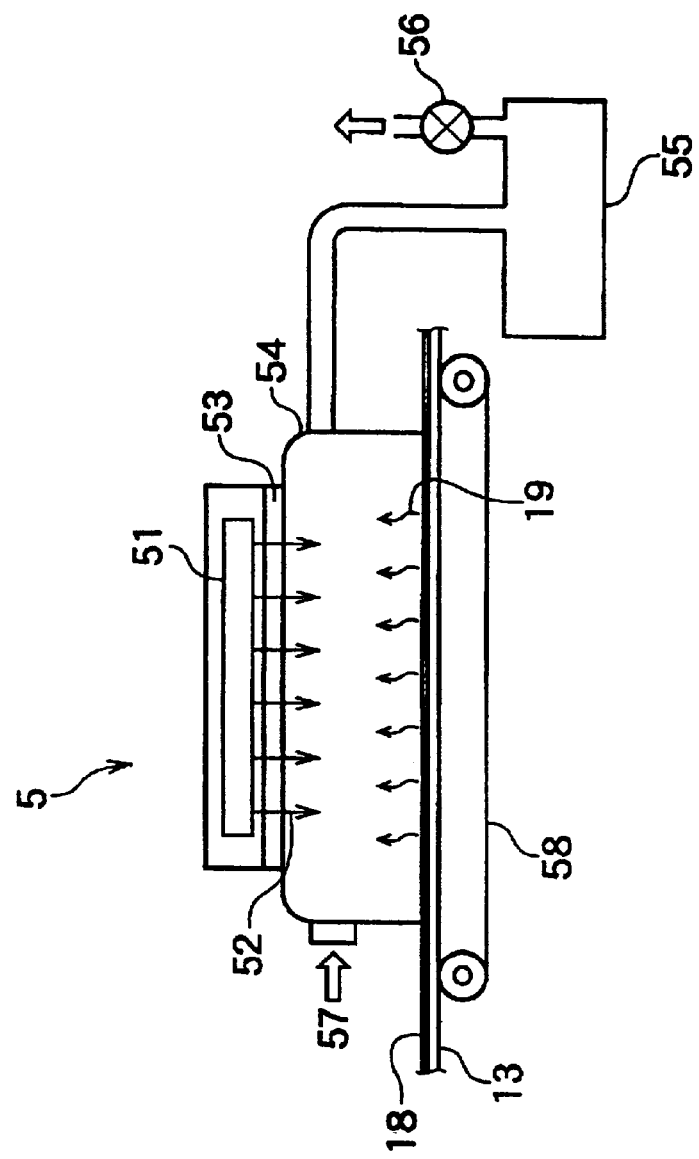
FIG. 5 is a schematic view of the coating method of this invention using an infrared ray lamp device.

As shown for example in FIG. 5, with respect to an infrared lamp device 5, the electrode layer 18 coated onto the current-collecting member 13 is moved by the conveyor 58 in the cabinet 54 and infrared radiation 52 generated by an infrared generator 51 is directed onto the electrode layer 18 coated onto the current-collecting member 13. An infrared permeable wall 53 is installed to let the infrared radiation pass between the cabinet 54 and the infrared generator 51. This infrared permeable wall 53 may not be needed if no problem exists with the infrared generator 51 and the type and concentration of vaporized gas. The vaporized solvent 19 from the electrode layer 18 is blocked off from the infrared generator 51 by the infrared permeable wall 53. The cabinet 54 filled inside by the solvent 19 reaches an equalized concentration when the concentration attains a high level, and the vaporization is limited. Therefore, the solvent is recovered by suctioning it into the solvent recovery unit 55 inside the cabinet 54 with the fan 56. In that time, external air 57 is supplied into the cabinet 54 so that the external pressure will match the gas pressure inside the cabinet 54. However, this external air 57 is not for vaporizing the solvent 19 by air blow. A level of external air 57 to well agitate the uniform concentration of the solvent is sufficient and though dependent on the size of the cabinet 54, a flow speed of for example 0.5 meters per minute is sufficient. When the electrode layer 18 is coated on both surfaces of the current-collecting member 13, the infrared radiation may be directed to both sides of the electrode structure.

Infrared radiation ranging from the near-infrared close to the visible light level to mid-infrared, to far-infrared close to the electromagnetic spectrum can be used, rather than propagation of heat to the mixed material through the air. If the mixed material can be heated remotely with hardly any transmission through air, then any type of infrared radiation may be utilized. Near-infrared radiation has a high transmittance (permeance) rate into the interior of the mixed material so that the interior of the mixed material can be heated.

Figure 6:
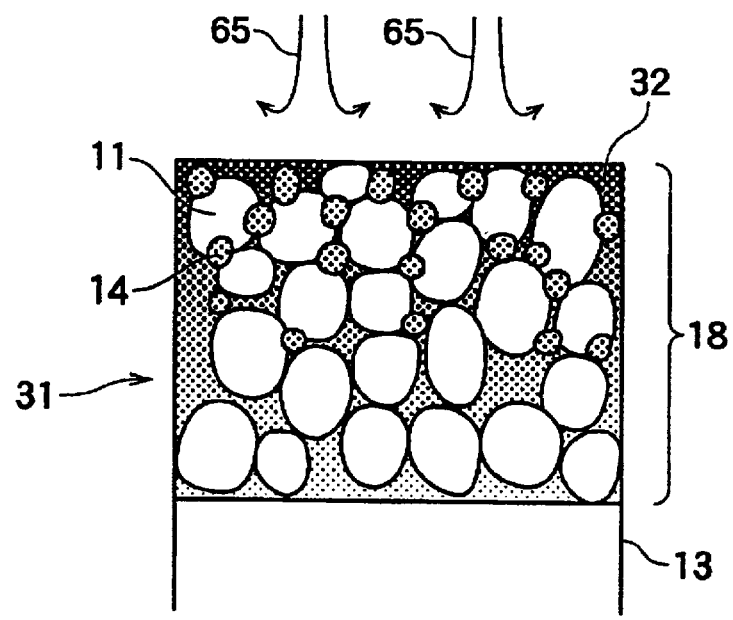
FIGS. 6(A) and 6(B) illustrate the drying of the mixed compound by heated air and by infrared radiation, respectively.
Figure 6:
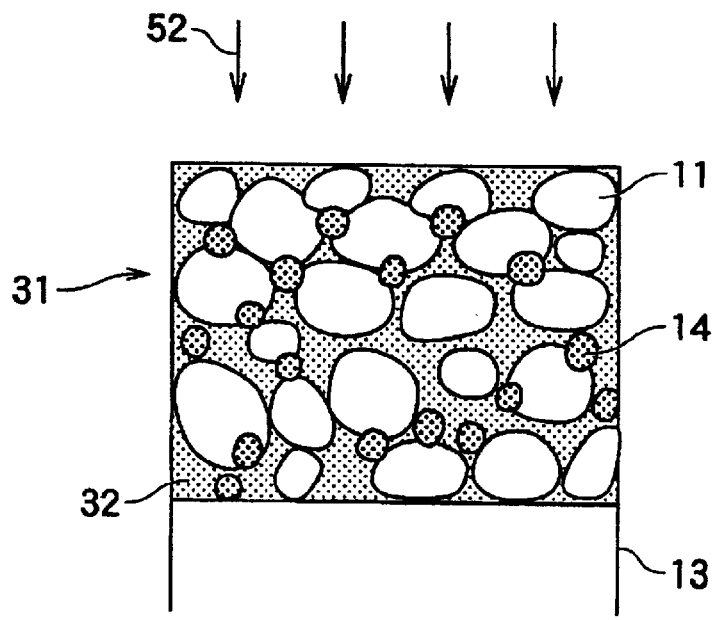

When infrared radiation is used as a means to vaporize the solvent 19 and dry the mixed material 31, the electrode layer 18 adheres (or bonds) welt to the current-collecting member 11, and the electrical resistance of the electrode layer 18 is also low. FIG. 6 shows an enhanced view of the internal state of the mixed material 31 when the solvent 19 of the mixed material coated on the current-collecting member 12 is vaporized.

In FIG. 6(A), the solvent vaporization process works as follows. When heated air 65 is applied to the surface of the mixed material, the area around the surface of the mixed material 31 suddenly warms up in the heated air, and the solvent around the surface is vigorously vaporized and blown away by the heated air 65. The solvent near the surface therefore quickly vaporizes, and to compensate, the solvent at the interior of the mixed material and around the collector electrode moves to the vicinity of the surface. The binder and the powdered electrically-conducting substance mixed in the solvent are at this time carried to the surface of the mixed material 31 along with the solvent. As a result, the concentrations of binder and powdered electrically-conducting substance on the current-collecting member side of the mixed material become weak (or thin).

In contrast, the process for vaporizing the solvent in this invention as shown in FIG. 6(B), works as follows. When the infrared radiation 52 is directed onto the mixed material surface, the infrared radiation 52 permeates into the interior of the mixed material, and heats up the entire mixed material. No heated air is blown at this time so that the solvent gradually evaporates (vaporizes) from the surface of the mixed material. The concentrations of binder and powdered electrically-conducting substance 14 therefore remain uniform overall. As a result, the binder concentration in the vicinity of the current-collecting member does not become weak (or thin) in the electrode layer consisting of dried mixed material 31. Accordingly, the electrode layer adheres well to the current-collecting member 13. Further, the concentration of the powdered electrically-conducting substance in the vicinity of the current-collecting member does not become weak either, so that the overall electrical resistance (impedance Ω/ohm) of the electrode layer is low. Consequently, the effect of utilizing infrared radiation is especially effective when the overall thickness of the multiple layers is large.

Current-Collecting Member

The current-collecting member 13 may be any material capable of conducting electricity, and the material and shape can be selected according to the electronic component. As one example, the current-collecting member may be aluminum or steel and formed in a plate, leaf or mesh shape. When the current-collecting member is a plate or leaf shape, one or both sides are used according to the structure of the electronic component.

Figure 12:
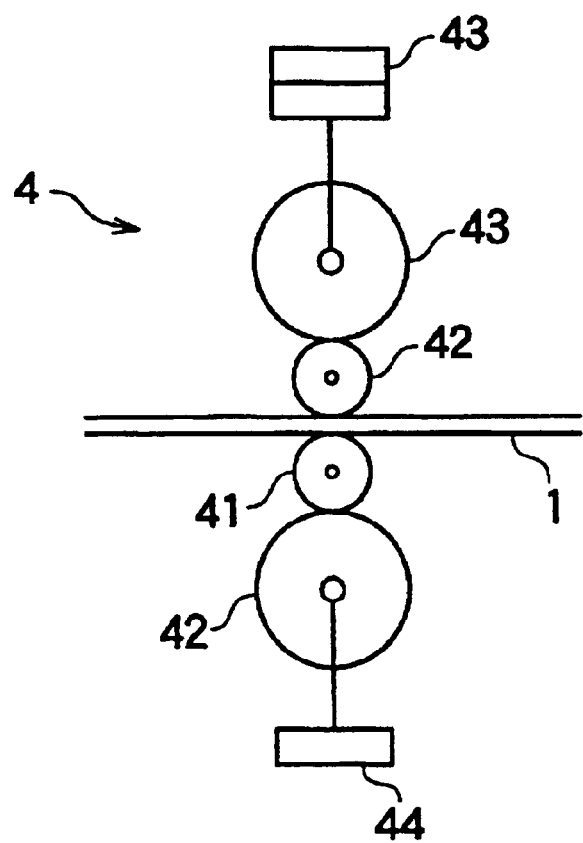
FIG. 12 is a side view showing the pressing and sealing device.

The electrode layer 18 or adhering to the current-collecting member 13 may be pressed into the current-collecting member to make it further adhere. The bonding (adhering) may for instance be performed with a pressing and sealing device 4 such as shown in FIG. 12. An electrode structure 1 made from current-collecting member coated with mixed material is put between the pressure rollers 41, and the electrode layer can be bonded to the current-collecting member by applying a rotating pressure with the pressure device 43 by means of the backroller 42.

Battery

Figure 7:
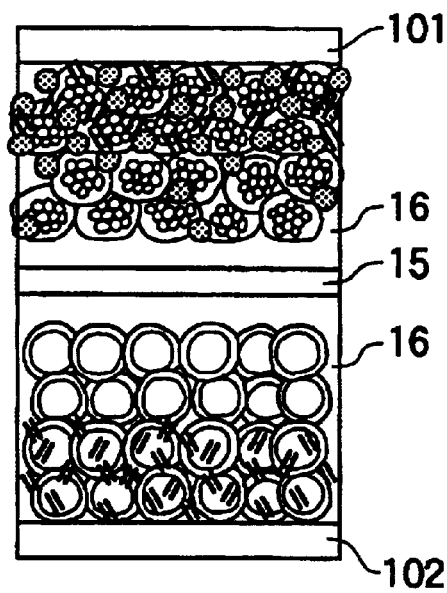
FIGS. 7(A) and 7(B) illustrate alternative battery structures of this invention.
Figure 7:
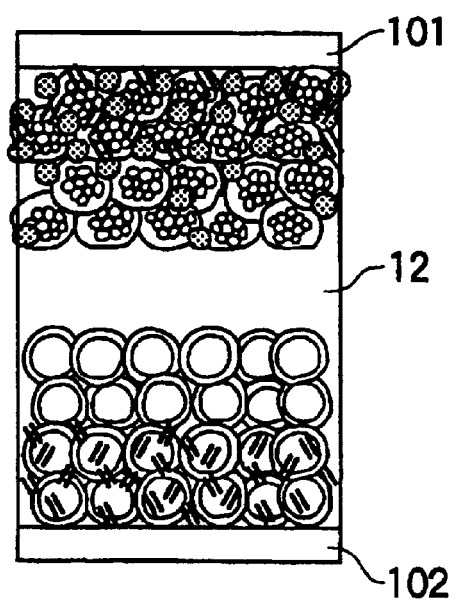

The multilayer electrode structure of FIG. 1(A) or FIG. 1(B) can be used as the positive electrode, and a multi-layer electrode structure for a negative electrode can be used as shown in FIG. 1(C) or FIG. 1(D). An electrolyte is positioned between these electrodes. FIG. 7 shows an example of a battery using as the positive electrode an electrode structure as shown in FIG. 1(B) and as the negative electrode an electrode structure as shown in FIG. 1(D). Here, FIG. 7(A) shows the case when the electrolyte is an electrolytic fluid 16, and a separator 15 is placed between the mufti-layer electrodes. FIG. 7(B) shows the case when the electrolyte is ion-conducting polymer 12. The separator 15 is installed to isolate one pair of the multi-layer electrode structures 1, and the electrolyte can be used in solid solution when required according to circumstances.

Double-Layer Capacitor

Figure 8:
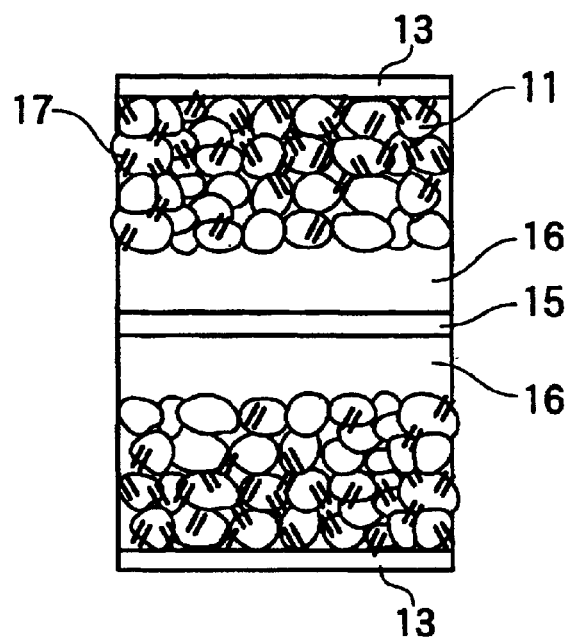
FIGS. 8(A) and 8(B) illustrate alternative structures for the electrical double-layer capacitor.
Figure 8:
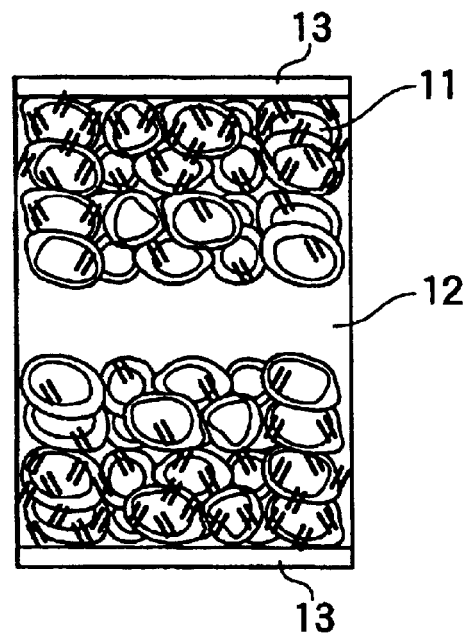

The dual-layer capacitor has a structure with electrolyte placed between one pair of multi-layer electrodes of the electrode structure of FIG. 1(E) or one pair of multi-layer electrodes of the electrode structure of FIG. 1(F). A double-layer capacitor utilizing the multi-layer electrode structure of FIG. 1(E) is shown in FIG. 8(A), and a double-layer capacitor utilizing the multi-layer electrode structure of FIG. 1(F) is shown In FIG. 8(B). In FIG. 8(A), a separator 15 is placed between the multi-layer electrodes when the electrolyte is an electrolytic fluid 18. FIG. 8(B) shows the case when the electrolyte is ion-conducting polymer 12. The separator 15 is installed to isolate one pair of multi-layer electrode structures 1, and the electrolyte can be used in solid solution when required according to circumstances.

Examples of the multi-layer electrode structure are described next.

Making the Electrode Structure Sample Pieces

Four multi-layer electrode structure sample pieces 1–4 were prepared and dried using two types of heating methods; one method was infrared heating and the other was with heated air. The peeling strength and impedance (Ω/ohm) of each of these sample pieces were measured. The ratio (proportions) of electrode material, powdered conducting material, binder, and solvent material used in the manufacture of the sample pieces are shown in Table 1. The results of testing peeling strength and impedance (Ω/ohm) are shown in Table 2.

TABLE 1

ACTUAL ELECTRODE COMPOSITION (per weight)

|  | | Electrolyte | Powder conducting material | Binders | | | | |
| --- | --- | --- | --- | --- | --- | --- | --- | --- |
|  | Electrode layer | activated carbon | (carbon black) | Polymer A1 | Teflon | PVDF | Electrode thickness | Solvent (per weight) |
| Sample 1 | first | 18 | 2 | 0.8 | | | 75 | NMP (30) |
|  | second | 18 | 2 | 0.6 | | | 250 | NMP (34) |
| Sample 2 | first | 18 | 2 | 1.2 | | | 75 | NMP (30) |
|  | second | 18 | 2 | 0.8 | 0.24 | | 250 | NMP (34) |
| Sample 3 | first | 20 | | 1 | | | 50 | NMP (30) |
|  | second | 20 | | | 0.5 | | 250 | NMP (34) |

TABLE 1-continued

ACTUAL ELECTRODE COMPOSITION (per weight)

|  | Electrode layer | Electrolyte activated carbon | Powder conducting material (carbon black) | Binders Polymer A1 | Teflon | PVDF | Electrode thickness | Solvent (per weight) |
|---|---|---|---|---|---|---|---|---|
| Comparison 1 | first | 18 | 2 | 0.8 | 0.24 | | 330 | NMP (34) |
| 4 | first | LiCoO$_2$ 91 | 6 | 8 | | | 20 | NMP (30) |
|  | second | 91 | 6 | | | 3 | 60 | MEK (20) + NMP (10) |
| Comparison 2 | first | 91 | 6 | | | 3 | 80 | MEK (20) + NMP (10) |

TABLE 2

|  | INFRARED HEATING | | | HOT AIR HEATING | |
|---|---|---|---|---|---|
|  | Dry Strength | Peeling Strength | Impedance (Ω/ohm) | Peeling Strength | Impedance (Ω/ohm) |
| Sample 1 | 30 V, 1 hr | a | 0.1 | b | 0.5 |
| Sample 2 | 30 V, 1 hr | a | 0.15 | b | 0.7 |
| Sample 3 | 30 V, 1 hr | a | 0.7 | b | 6 |
| Sample 4 | 30 V, 1 hr | a | 0.9 | b | 2.3 |
| Comparison 1 | 30 V, 1 hr | b | 0.2 | c | 1.2 |
| Comparison 2 | 30 V, 1 hr | b | 2 | c | 6 |

Drying with heated air was achieved in a heated air oven which applied heated air onto the surface of the mixed material from a hot air blow outlet. The heated air was regulated to a temperature of approximately 80 to 200 degrees centigrade and a flow speed of 15 to 25 meters per minute.

A far-infrared ceramic panel heater PH-100, iPH100C (made by SAKAGUCHI E.H VOC CORP.) was utilized as the infrared lamp device. The infrared radiation drying conditions for all the samples were 30 volts for one hour.

Sample 1 is an electrode for useful capacitors. A first electrode layer was formed by adding phenol active carbon made from phenol resins (made by Kansai Chemical Corp.) with carbon black as the powdered electrically-conducting substance, and dry type mixing utilizing a mixer. Afterwards, polymer A1 was added to the dry mix as the binder and mixing performed. Further, NMP N-ethyl-2-pyrrolidione was added as the solvent and mixing performed. After the mixing, the material was coated onto the current-collector member with a surgical knife applicator. The samples were then dried either by heating with infrared radiation or by heated air. The thickness of the electrode was 75 micrometers. A second electrode layer was formed using the same method as was used to form the first electrode layer, except that the amount of polymer A1 was reduced and the amount of dilute solvent increased. The thickness of the electrode was 250 micrometers.

The first electrode layer of sample 2 was made by approximately the same method as used to form the electrode layers of sample 1. The second electrode layer of sample 2 was prepared by adding Teflon added to the polymer A1 used as the binder. Teflon used was a polymer that forms easily into fibrils.

Sample 3 is useful as a capacitor electrode and manufactured in approximately the same way as sample 1 and sample 2. The multi-layer electrode of sample 3 did not include the carbon black additive in either the first electrode layer or second electrode layer. Polymer A1 was added as a binder to the first electrode and Teflon was added to the second electrode. The polymer A1 is an ion-conducting polymer material and is shown in Table 3.

Sample 4 is an electrode structure for a positive electrode of a battery. In sample 4, LiCoO$_2$ was the electrode material, and carbon black served as the powdered electrically-conducting substance. In the first electrode layer, polymer A1 was added as the binder, and in the second electrode layer, PVDF was added as the binder. PVDF (polyvinylidene fluoride) is a polymer that forms easily into fibrils. NMP (N methylpyrrolidone) was used as the solvent in the first electrode layer, and MEK (methylethylketone) was used as the solvent in the second electrode layer.

TABLE 3

Ion-conducting polymer raw material (A1)

| Substance | Mixing ratio (weight parts) |
|---|---|
| Difunctional (propylene glycol/ethylene glycol) random copolymer, SANNIX FA-103 (PO/EO = 2/8, Mw = 3,282, Sanyo Chemical Industries, Ltd.) | 8.36 |
| Difunctional polyol, 1,4-butanediol | 0.34 |
| Ethylene cyanochydrins | 1.27 |
| Reaction catalyst NC-IM (Sankyo Air Products K.K.) | 0.03 |
| Total | 10 |

Comparison 1 In Table 1 Is an example of a thickened second electrode layer without the first electrode layer of the sample 2. Comparison 2 in Table 1 is a thickened second electrode layer without the first electrode layer of the sample 4. Comparison 1, as shown in Table 2, shows a lower peeling strength and a higher impedance (Ω) either with Infrared heating or heated air comparing to the sample 2. Also, Comparison 2 shows, as shown in Table 2, shows a lower peeling strength and a higher impedance (Ω) either with infrared heating or heated air comparing to the sample 4. Accordingly, the multi-layer electrode structure shows more effective peeling strength and impedance (Ω) than a single electrode layer.

Multi-Layer Electrode Structure Measurement Results

Figure 9:
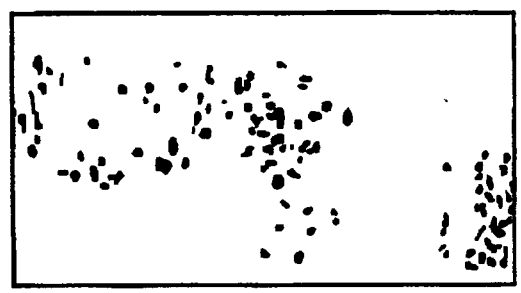
FIGS. 9(A)–9(C) show (taken from photographs) the level of peeling strength as tested.
Figure 9:
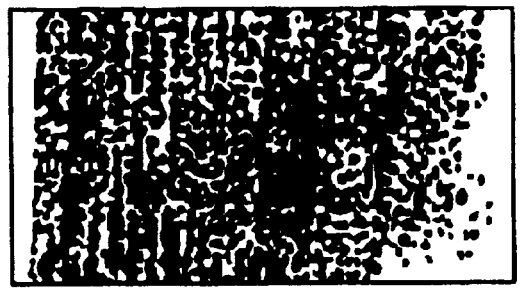
Figure 9:
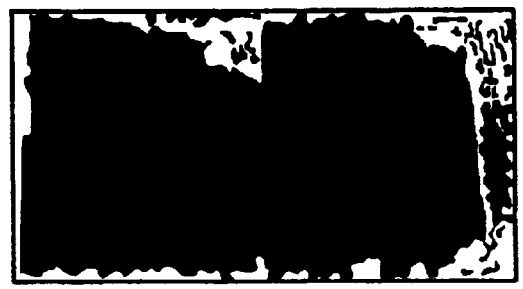

To measure the peeling strength, cellophane tape was attached to the electrode layer fabricated on the surface of the current-collecting member, and the cellophane tape then pulled away to make the electrode layer stuck to the cellophane tape separate from the current-collecting member. A peeling strength ranking could then be established according to the amount of electrode layer peeled from the surface of the current-collecting member. FIG. 9 shows the electrode layer stuck to the cellophane tape (view using photograph). In FIG. 9(A), a mere fraction of the upper layer of the electrode layer has thinly peeled away (The black portion is the portion where the electrode layer has peeled.) and is rank a. In FIG. 9(B), a middle layer of the electrode layer has thinly peeled off (The black portion is the portion where the electrode layer has peeled.) and is rank b. In FIG. 9(C) the electrode layer has completely peeled off from the current-collecting member (The black portion is the portion where the electrode layer has peeled.) and is rank c.

To measure the impedance ($\Omega$/ohm), the electrodes formed on the collector element were put between copper plates of 2 centimeters in diameter and 5 millimeters thick. A pressure of 4.5 kilograms per centimeter was applied from abode and below, and the resistance at 10 kilohertz AC was measured with an impedance analyzer.

On comparing infrared heated samples and hot air heated samples having the same sample numbers, in all cases, the peeling strength for the infrared heated samples was found to be "a" rank and for the hot air heated samples was found to be "b" rank. Here, the peeling strength for infrared heated samples was found to be one rank higher. The impedance test results also indicated that the impedance ($\Omega$/ohm) of the infrared heated samples was small, and especially lowered for sample 2.

The electrode material coated with ion-conducting polymer is described next. Electrode structure coated with ion-conducting polymer.

Figure 10:
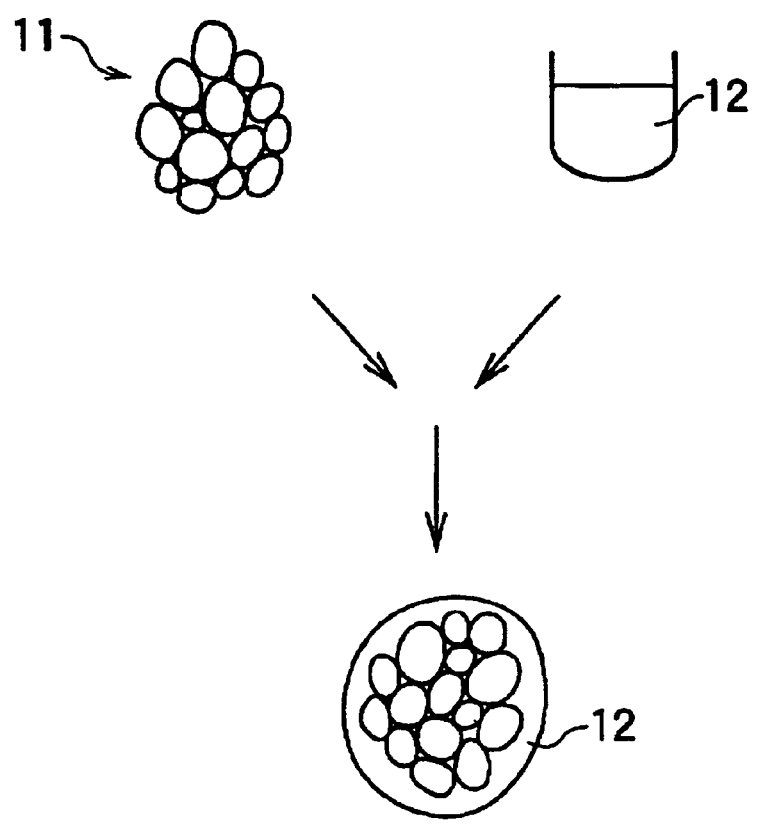
FIG. 10 is a schematic view showing the coating of ion-conducting polymer.

In FIG. 10, the powdered electrode active substance 11 has the shape of particles consisting of bonded particles like $LiCoO_2$, and the process for depositing the ion-conducting polymer 12 is shown. The term "coating" refers to a stat where ions can migrate sufficiently between the ion-conducting polymer 12 and the powdered electrode active substance 11 lover their entire surfaces. The ion-conducting polymer 12 is deposited on the surface of the powdered electrode active substance 11 as a coating of ion-conducting polymer 12. The finer the particles, the more active the powdered electrode active substance 11 becomes. However, this increased activity is suppressed by depositing on the powdered electrode active substance 11 a coating of ion-conducting polymer 12, so the powdered electrode active substance 11 can become stable. When the deposit of ion-conducting polymer 12 is thick, the electrical conduction decreases, and the current (charge) collection is poor. Accordingly, forming a thin coating of ion-conducting polymer is preferable. Inventions relating to electrode structures coated with ion-conducting polymer have already been proposed by the applicants of this invention (Japanese Patent Application 11-262501, and Japanese Patent Application 11-262502).

The powder shape such as for the powdered electrode active substance 11 and powdered conducting material 14 is a fine particle substance. Further such a powder is a collection of many substances. In certain cases, this fine particle substance refers to a state wherein a large number of substances in a fine particle state constitute an agglomeration.

Powdered Electrode Active Substance

The powdered electrode active substance uses ion intercalate-deintercalate materials and $\pi$-conjugated conductive macromolecular materials. There are no particular restrictions on the electrode active substance used as the positive electrode for non-aqueous electrolyte batteries. However, in the case of chargeable batteries, chalcogen compounds allowing ion intercalate-deintercalate or composite chalcogen compounds containing lithium are recommended.

Useful chalcogen compounds may be $FeS_2$, $TiS_2$, $MoS_2$, $V_2O_5$, $V_6O_{13}$, $MnO_2$, etc. Typical chalcogen compounds containing lithium are $LiCoO_2$, $Li_xN_yM_{1-y}O_2$, where M expresses one or more metallic elements selected from transitional metals and aluminum, and preferably one or more metallic elements selected from among cobalt, manganese, titanium, chromium, vanadium, aluminum, and $0.05 \leq x1.10$, $0.5 \leq y \leq 1.0$) and composite lithium oxides, $LiNiO_2$, $LiMnO_2$, $LiMn_2O_4$, etc. These compounds may be obtained by using lithium, cobalt, nickel, manganese oxides, salts or hydroxides as starting materials, mixing these starting materials together according to composition desired and baking the mixture in an oxygen atmosphere at a temperature of 600 to 1,000 degrees centigrade.

There are no particular restrictions on the electrode active material used as the negative electrode for non-aqueous electrolyte batteries. However, a material allowing lithium ion insertion/separation may be used, as well as lithium metal, lithium alloys (alloys such as lithium and aluminum, lead, indium) and carbon quality materials may be utilized.

Polyacetylene types, polyaniline types, polypyrrole types, polythiophene types, poly $\rho$ (para)-phenylene types, polycarbazole types, polyacene types and sulfur polymer types are among the useful $\pi$-conjugated conductive macromolecular materials.

Using lithium metals in the negative electrode achieves a large battery capacity particularly in primary non-aqueous electrolyte batteries.

Also in nonaqueous electrolyte batteries, using carbon materials in the negative electrodes, that are capable of lithium ion insertion/separation yields a longer battery cycle life span. There are no particular restrictions on the carbon material used but materials such as pyrolytic carbon types, coke types (pitch coke, needle coke and petroleum coke, etc.) graphite types, glass carbon types, organic macromolecular compound fired products (carbonized pieces baked to a suitable temperature such as phenol resin, furan resin) carbon fibers and active carbon may be utilized.

Powdered Electrically-Conducting Substance

The powdered electrically-conducting substance raises the conductivity of the electrode structure and though there are no particular restrictions, materials such as metal powder and carbon powder may be used. Particularly preferred carbon powders are pyrolytic carbons such as carbon black, and their graphite products, artificial and natural scaly graphite powder, carbon fibers and their graphite products, etc. Product mixtures of these carbon powders can also be utilized.

Ion-conducting Polymer

The ion-conducting polymer is a polymer which can dissolve at least the lithium salts described hereafter at a concentration of at least 0.1 M (moles/l), the polymer containing the lithium salt at a concentration of at least 0.1 M having an electrical conductivity of $10^{-8}$ (siemens)/cm at room temperature. It is to be particularly preferred that the ion-conducting polymer dissolves at least lithium salts to a concentration of 0.8M–1.5M, the resulting polymer solution having an electrical conductivity of $10^{-3}$ S/cm at room temperature.

The lithium salt is at least one type of lithium salt having $ClO_4^-$, $CF_3SO_3^-$, $BF_4^-$, $PF_6^-$, $AsFe_6^-$, $SbF_6^-$, $CF_3CO_2^-$ or $(CF_3SO_2)_2N^-$ as anion.

The ion-conducting polymer raw material is a substance which produces the ion-conducting polymer by cross-linking, etc., when energy is supplied externally. The energy may be heat, ultraviolet light, light or electron radiation.

The method of manufacturing these electrode structures will now be described.

(a) Manufacture of Electrode Structure

The method of coating the powdered conductive material with the ion-conducting polymer as is shown in general in FIG. 10 is to press-slide the ion-conducting polymer and the powdered electrode active substance against each other.

In this process, by using only a minute amount of the ion-conducting polymer, the particle surfaces of the powdered electrode active substance are coated with the ion-conducting polymer, no voids are formed, and gaps in the powdered substance are reduced.

(b) Press-Sliding

Press-sliding is the action of sliding while pressing mixtures 10 of the ion-conducting polymer 12 or the raw material of the ion-conducting polymer 12 and the powdered substance 11 together. An external force is applied to the mixtures so that they cohere to each other and the particles rotate, and this process is performed repeatedly to obtain a press-sliding product.

(c) Press-Sliding Mixer

Figure 11:
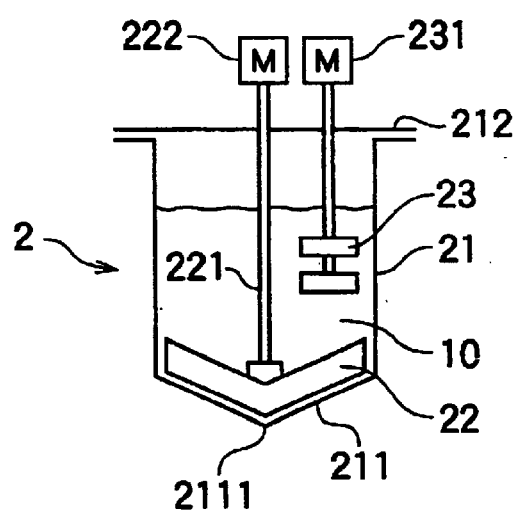
FIGS. 11(A)–11(D) illustrate the press-sliding mixer.
Figure 11:
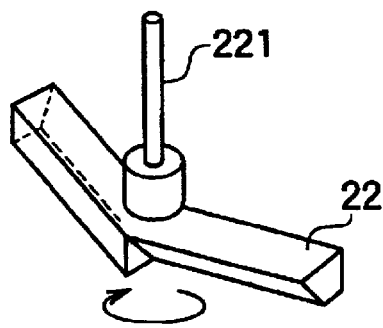
Figure 11:
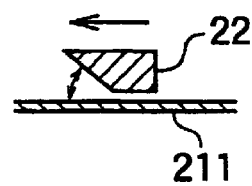
Figure 11:
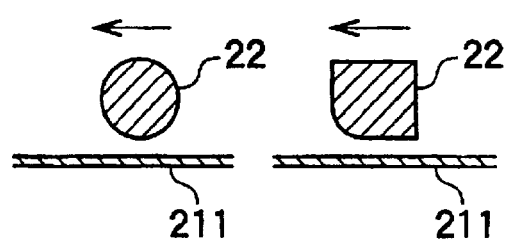

The press-sliding mixer 2 is shown, for example, in FIG. 11. The mixture 10 of the ion-conducting polymer 12 or its raw material with the powdered substance 11, or the mixture 10 comprising this mixture and a solvent or the like, is introduced into a container 21 via top 212, and the main blade 22 is rotated. There is a gap between a base or bottom 211 of the container 21 and a bottom surface of the main blade 22. When the main blade 22 is rotated, pert of the mixture 10 enters the space between the base 211 of the container and the main blade 22, and is subjected to press-sliding, and is kneaded. This process is repeated so that the ion-conducting polymer 12 or its raw material coats the powdered substance 11.

A press-sliding mixer 2 may if necessary be provided with a dispersion blade 23 in the container 21. The dispersion blade 23 is rotated at high speed to disperse the press-slid mixture 10.

(d) Container

The container 21 is provided for holding the mixture 10 which is press-slid and stirred. The bottom surface or base 211 of the container 21 slants upwards from the central bottom part 2111 towards the circumference of container 21. The bottom 211 may be formed in the shape of, for example, a grinding mortar, and the angle of the slant of bottom part 211 may, for example, be 120 degrees. The bottom 211 of the container is wear-resistant, and can be formed by thermal spraying with tungsten or carbide using SUS. Plural bottom parts of this type may also be formed on the bottom surface 211.

(e) Main Blade

The main blade 22 functions together with the bottom surface 211 of the container 21, serving to press-slide and stir the mixture 10.

The main blade 22, is positioned via shaft 221 to the desired location relative to the bottom 211 of the container 21 as shown for example in FIGS. 11(A) and 11(B). Main blade 22 curves upwards corresponding to the slant of bottom 211 of the container 21. The main blade 22 may comprise two blades attached from the center part as shown in FIG. 11(B), or it may comprise a larger number of blades, e.g. 10 or more, depending on the amount and type of mixture.

The number of rotations of a main motor 222 driving the main shaft 221 is set low for example to 120 rpm or less, when press-sliding is performed.

The gap between the bottom surface 211 of the container 21 and the base surface of the main blade 22 is set as narrow as is necessary for press-sliding the mixture, for example 15 mm or less. This distance depends on the capacity of the press-sliding mixer 2 and on the shape of the main blade, etc.

The surface in the motion direction (press-sliding direction) of the main blade 22 is formed so that a pressing angle $\theta$ relative to the bottom surface 211 of the container 21 is an acute angle. For example, if the cross-ection of the main blade 22 is a reverse trapezoid as shown in FIG. 11(C), the pressing angle is from 3 degrees to 70 degrees. The cross-section of the main blade 22 may also be circular or have a rounded corner as shown in FIG. 11(D).

The material of the main blade has wear-resistant properties, and is formed for example by thermal spraying with tungsten or carbide using SUS.

If a surface in a direction opposite to the motion direction (press-sliding direction) of the main blade 22 is formed for example effectively perpendicular to or at an obtuse angle to the bottom surface, the mixture 10 can be collected around the main shaft 221 by rotating the main shaft 221 in the reverse direction.

If there are plural bottom parts on the bottom surface 211, the center parts of the main blade 22 are also disposed in positions of the bottom part corresponding to their number.

(f) Dispersing Blade

The dispersion blade 23 is intended to disperse the mixture 10 which has been press-slid by the main blade 22. The dispersion blade 23 is disposed in a position at which the mixture 10 can be dispersed, and it rotates via motor 231 at a high speed such as 1000–4000 rpm. Due to this high speed rotation, the ion-conducting polymer 12 or its raw material coated on the particle surfaces of the powdered substance 11 uniformly disperses through the whole of the powdered substance.

This invention as described above renders the following effects.

A multi-layer electrode structure that adheres well to the current-collecting member can be obtained.

A multi-layer electrode structure with low electrical resistance can be obtained.

A multi-layer battery or double-layer capacitor having low electrical resistance and good bonding can be obtained.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What is claimed is:

1. A multi layer electrode structure comprising a plurality of electrode layers at least comprised of a binder made of a macromolecular substance and an electrode material and coated on a current-collecting material, wherein:

a first electrode layer in contact with said current-collecting material and a second electrode layer in contact with said first electrode layer are formed of different constituents or have different proportions of the same constituent;

said first electrode layer is thinner than said second electrode layer; and said first electrode layer has a stronger adhesive strength than said second electrode layer relative to said current-collecting material, thereby attaining effective adhesive properties and low electrical resistance of said first electrode layer;

said binder of said first-electrode layer comprises an ion-conducting polymer; and said binder of said second electrode layer comprises a polymer prone to form fibrils.

2. A multi-layer electrode structure according to claim 1, wherein at least said electrode layers further include a powdered electrically-conducting substance.

3. The multilayer electrode structure according to claim 1, wherein said electrode material is coated with an ion-conducting polymer.

4. The multi-layer electrode structure according to claim 1, wherein the percentage by weight of binder used in said first electrode layer is greater than the percentage by weight of binder used in said second electrode layer.

5. A multi-layer electrode structure according to claim 1, wherein at least one of said electrode layers further includes a powdered electrically-conducting substance.

6. The multi-layer electrode structure according to claim 1, wherein said ion conducting polymer is a polymer which can dissolve at least lithium salt at a concentration of at least 0.1M (moles/l), said polymer containing the lithium salt at a concentration of at least 0.1M having an electrical conductivity of $10^{-8}$ S (siemens)/cm at room temperature.

* * * * *